No. 812,148. PATENTED FEB. 6, 1906.
J. A. McCONNELL.
APPARATUS FOR MOLDING PLASTIC MATERIAL.
APPLICATION FILED FEB. 23, 1904.
2 SHEETS—SHEET 1
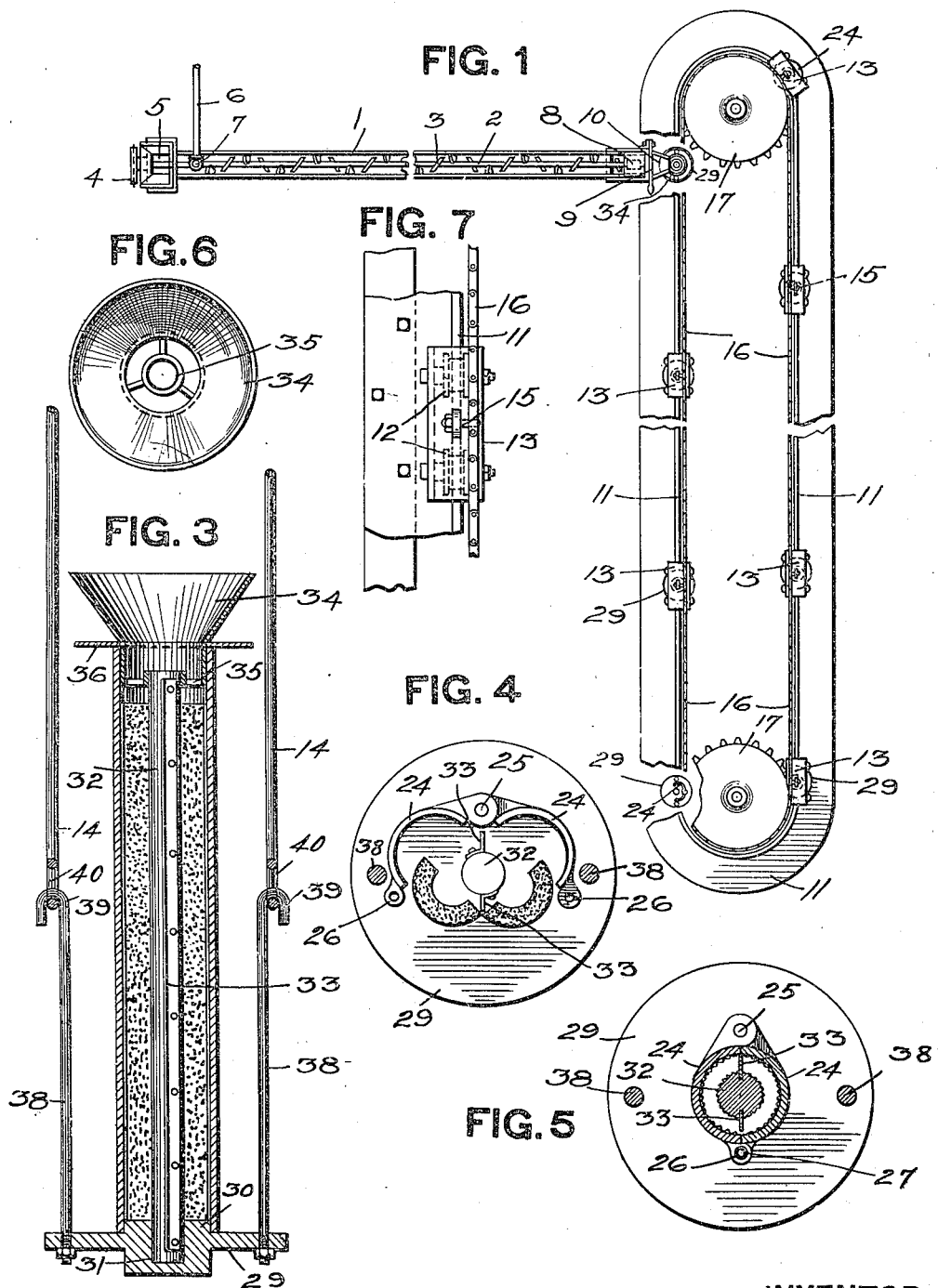
WITNESSES.
INVENTOR.

No. 812,148. PATENTED FEB. 6, 1906.
J. A. McCONNELL.
APPARATUS FOR MOLDING PLASTIC MATERIAL.
APPLICATION FILED FEB. 23, 1904.
2 SHEETS—SHEET 2.
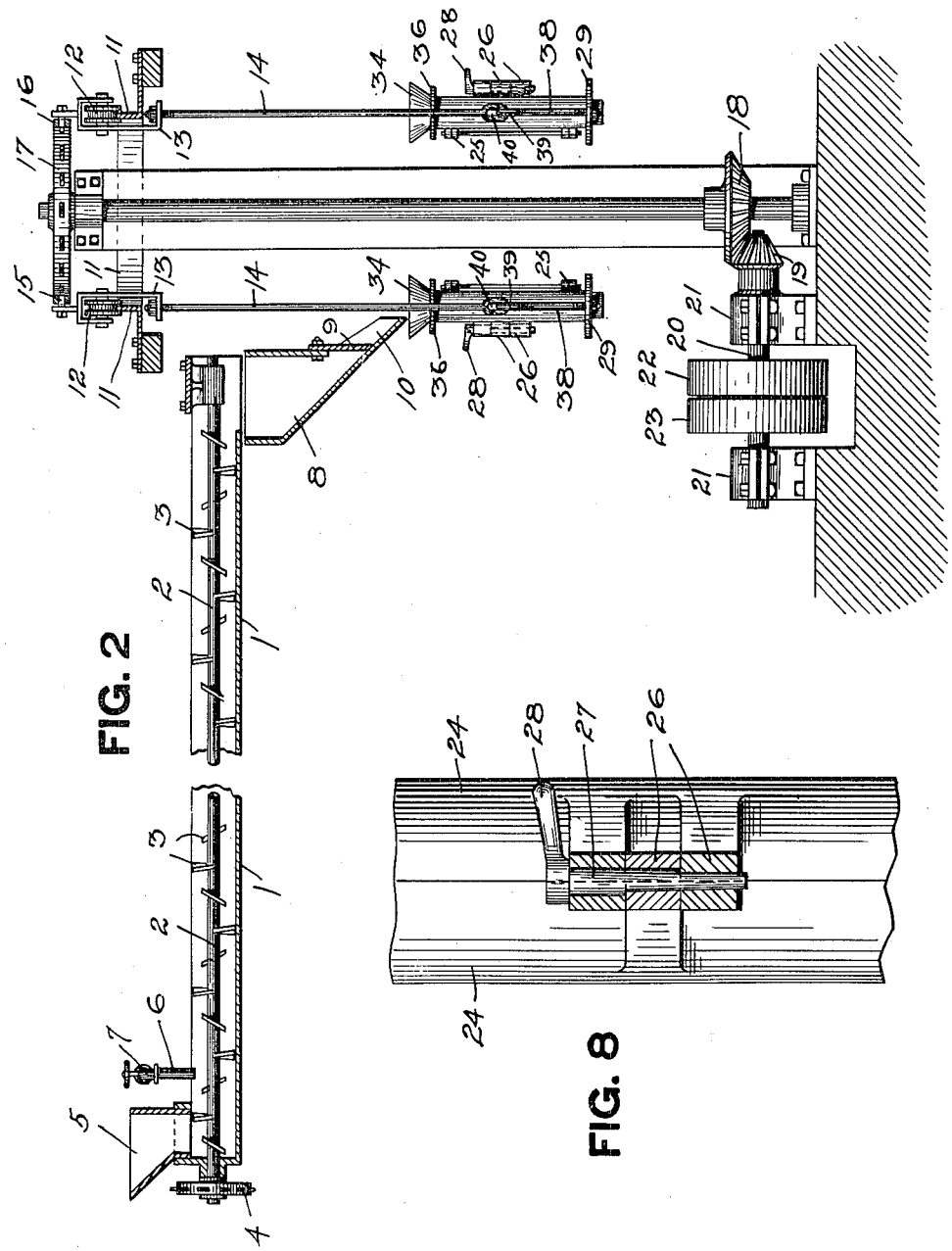
WITNESSES.
INVENTOR.

UNITED STATES PATENT OFFICE.

JOHN A. McCONNELL, OF ALLEGHENY, PENNSYLVANIA, ASSIGNOR TO McCONNELL ASBESTOS & COVERING CO., OF PITTSBURG, PENNSYLVANIA, A CORPORATION OF PENNSYLVANIA.

APPARATUS FOR MOLDING PLASTIC MATERIAL.

No. 812,148.          Specification of Letters Patent.          Patented Feb. 6, 1906.

Original application filed July 18, 1903, Serial No. 166,087. Divided and this application filed February 23, 1904. Serial No. 194,811.

*To all whom it may concern:*

Be it known that I, JOHN A. McCONNELL, a resident of Allegheny, in the county of Allegheny and State of Pennsylvania, have invented a new and useful Improvement in Apparatus for Molding Plastic Material, (division of Serial No. 166,087;) and I do hereby declare the following to be a full, clear, and exact description thereof.

My invention relates to apparatus for molding materials which set by the addition of water thereto—such as plaster-of-paris, calcined magnesia, cement, &c.—or mixtures of such materials with other suitable materials and preferably having asbestos, hair, hemp, or other fiber mixed therewith.

The object of my invention is to provide apparatus for this purpose which is adapted to mold such materials in practically a continuous stream or in rapidly intermittent batches, so that such apparatus when used in conjunction with a continuous mixing apparatus will carry out a continuous process of manufacturing such articles.

In the manufacture of tubular or semitubular plastic articles, such as non-heat-conducting coverings, the practice heretofore most generally followed has been to mix the materials in batches, adding enough water thereto and agitating the same until a substantial liquid mass was formed. This agitation had to continue until the materials had reached the first stages of setting. It was then poured into tubular or semitubular molds with cores in the center thereof and there allowed to set, after which the molded tube or half-tube and core were removed from the mold. The practice has been to pour the substantial liquid mass into the molds by hand from buckets, and the process at best was very slow. Furthermore, the batch method of mixing and molding was bad, because if molding was commenced before the setting process had commenced the product was poor and weak. On the other hand, if the molding was delayed until the first stages of setting had begun then the latter part of the batch would have to be molded after the setting had progressed too far, and consequently the molding broke the molecular adhesion and made the article inherently weak. There was also the further difficulty that the heavier particles sank to the bottom of the batch, so that the articles first molded from the batch were too light and porous, where those molded from the latter part of the batch were correspondingly too heavy and dense.

The object of my invention is to provide molding apparatus whereby the materials can be molded either in a continuous stream or rapidly-intermittent batches and as rapidly as mixed and at just the proper stage of the setting of the material, so that thereby greater uniformity of molded articles is secured and the process carried on much more expeditiously than heretofore.

The present application has for its purpose to claim the molding apparatus shown in my application filed August 4, 1900, Serial No. 25,909, for process of making pipe-coverings, and is a division of my application filed July 18, 1903, Serial No. 166,087.

In the accompanying drawings, Figure 1 is a plan view of my apparatus. Fig. 2 is a sectional elevation thereof. Fig. 3 is a longitudinal sectional view of one of the molds. Fig. 4 is a plan view of the same, showing the mold open and the contents being removed therefrom. Fig. 5 is a transverse sectional view of the same somewhat modified. Fig. 6 is a plan view of the funnel. Fig. 7 is an enlarged plan view of the trolley, and Fig. 8 is a detail illustrating the locking means for the mold.

My molding apparatus is designed for use in connection with a continuous wetting and mixing device, and in Figs. 1 and 2 such mixing device is illustrated diagrammatically by the trough 1, having located therein a mixer comprising a rotatable shaft 2, provided with mixing-blades 3 and suitably driven in any convenient way, as by means of a sprocket-wheel 4. The material will be admitted into the mixing-trough at one end thereof by placing the same in a hopper 5 or the like, and in the trough said material will be supplied with the necessary amount of water, as by means of a pipe 6, provided with a valve 7. The mixing-blades 3 on the shaft 2 will be set at an incline, as shown, and in the rotation of said shaft the material and water will be thoroughly mixed together and slowly fed forward and finally deposited in the hopper 8, provided with a gate 9, leading to the delivery-spout 10.

It will be understood that the described mixing apparatus is only diagrammatic and represents any apparatus capable of wetting and mixing the plastic material in a substantially continuous stream.

Adjacent to the hopper 8 is an endless overhead track 11, upon which travel a series of trucks composed of the grooved wheels 12 and angle-hangers 13, to which are secured the rods 14 for supporting the molds. The various trucks are provided with projecting studs 15, suitably attached to a sprocket-chain 16, said chain lying above the track 11 and passing around suitable sprocket-wheels 17 at the ends of said track. The shaft of one of these sprocket-wheels 17 extends downwardly and is provided with a bevel-gear 18, which meshes with a bevel-pinion 19 on a shaft 20, mounted in suitable bearings, as at 21, and provided with a fast pulley 22 and a loose pulley 23 for communicating motion to the sprocket-chain and moving the trucks supporting the molds. The belt is shifted alternately from one to the other of the pulleys 22 and 23, and thereby an intermittent travel is given to the molds, which is necessary by reason of the molds having to pause beneath the spout 10 in order to receive the mixed plastic material, and this stoppage admits of the opening of the molds and removal of the molded covering at the discharge end of the overhead conveying-track. It is apparent that the molds might be conveyed away on a traveling table or belt; but the overhead track is preferred.

Each of the molds is made in two sections 24 24, preferably hinged together, as at 25, and provided on their opposite edges with interlocking lugs 26, which are suitably perforated for receiving the locking-bolt 27, said locking-bolt being provided with eccentric portions, so that by turning the bolt the sections of the mold can be firmly drawn together and locked, as will be readily understood. A handle 28 is provided on the upper end of the bolt for turning the same. The mold-sections rest upon a supporting-plate 29, provided with a projecting rim 30, which fits into the lower end of the mold, and with a depression 31 for receiving the lower end of a mandrel 32. This mandrel is provided with diametrically opposite fins or webs 33, running the full length of said mandrel and suitably secured thereto, as by riveting or other suitable means, as shown in Figs. 3 and 4, or by having the fins fitted into a groove in the mandrel, as shown in Fig. 5. One of these fins is of a width equal to the space between the mandrel and the interior face of the mold, while the other fin is of slightly less width for a reason which will hereinafter appear.

On the upper end of the mold is placed a funnel 34, which projects down into the mold and is provided with a spider 35, having a central ring for supporting and centering the upper end of the mandrel. The funnel is also provided with projecting wings 36 for supporting the funnel on the top of the mold when the mold is opened up, as shown in Fig. 5. Secured to the supporting-plate 29, on diametrically opposite sides thereof, are upwardly-projecting rods 38, provided at their upper ends with hooks 39, which engage eyes 40 on the lower ends of the supporting-rods 14. The rods 38 are of such length that the hooks on the upper ends thereof lie slightly above the longitudinal center of the mold, so that the latter is held by gravity in an upright position. The hooks, in effect, form trunnions for supporting said molds.

In the use of my apparatus the materials will be mixed in the trough 1 in a practically continuous stream and fed along the same slowly, thus giving it time to thicken or set sufficiently for molding to the best advantage by the time that it reaches the hopper 8, and it will then be introduced by means of the spout 10 into the molds. The molds are moved underneath the spout by the sprocket-chain, stopped under the spout to receive the material, and after being filled the gate 9 is closed and the sprocket-chain 16 again put in motion, thereby moving a mold from underneath the spout 10 and bringing the next mold underneath said spout, when the sprocket-chain is again stopped and the gate 9 opened to admit the material to this mold, and so on continuously. The molding operation takes place at the same rate as the mixing operation, so that as soon as the plastic material has thickened or set sufficiently for molding it is immediately molded, thereby preventing the settling of the heavier particles to the bottom of the mold or the batch and also obviating the too firm setting of the material before molding. As a result the sections are uniform in texture throughout and all of the sections of a batch are of exactly the same quality. The molds are moved intermittently preferably toward the dry-house until the articles are thoroughly set, when they are removed from the molds and placed in the dry-house.

Non-conducting coverings when molded of magnesia, plaster-of-paris, cement, or similar plastic material are necessarily quite fragile, and in order to strengthen the same and form dead-air spaces to assist in preventing the escape of air and heat I prefer to embed therein on the outer surface during the molding operation fluted or corrugated paper-board, such as strawboard or asbestos-board, or stiff sized cloth or fluted or corrugated sheet metal, which may best be done by placing in the molds sheets of the fluted material, said sheets extending around the interior of the mold. The sheet around the interior of the mold will have its edges meet on opposite sides of the wider of the two fins or webs 33. The opposite or narrower of said webs fits at its outer edge against the inner side of the corrugated or fluted strengthening-sheet. The mold having in it such strengthening-sheet is then filled with plastic material, and the setting of the latter firmly unites the strengthening-sheet to the plastic material, thereby reinforcing the latter and at the same time forming heat-insulating air-cells, and the two sections of the covering may be united by the outer strengthening-sheet, so as to form practically a hinge, as shown in Fig. 5. When using corrugated metal, I prefer to embed it in the surface of the covering, so that a thin stratum of the insulating material is on the outside of said metal, thereby excluding the air from the metal and preventing it from rusting. The metal, however, need only be embedded on one side in the insulating material, the outer surface thereof being protected by a sheet of paper, cloth, or similar material. When, however, it is only desired to form fluted air-cells on one or both surfaces without applying the strengthening-sheet, I use a fluted mold and mandrel, as shown in Fig. 4.

By suitably changing the form of the molds the apparatus may be used for molding articles other than pipe-coverings, such as cement and similar blocks and the like.

What I claim is—

1. In apparatus for molding in a substantially liquid condition materials which set by the addition of water thereto, the combination with mixing and wetting apparatus having a discharge-opening, of an endless series of tight-bottomed molds, and mechanism for carrying the said molds in succession underneath the discharge-opening of the mixing and wetting apparatus.

2. In apparatus for molding in a substantially liquid condition materials which set by the addition of water thereto, the combination with mixing and wetting apparatus, of an endless series of molds having tight bottoms, means for delivering the material from the mixer, and mechanism for giving an intermittent travel to said molds and carrying the same in succession underneath said delivering means.

3. In apparatus for molding in a substantially liquid form materials which set by the addition of water thereto, the combination of a series of vertical molds each composed of two sections hinged together and having tight bottoms, means for locking the said sections together, suspending means connected to the bottoms of said molds, and an overhead carrier to which said suspending means are connected.

4. In apparatus for molding articles from materials which set by the addition of water thereto, the combination of a series of molds, an overhead track, trolleys thereon from which the molds are suspended, an endless chain, and connecting means between the same and said trolleys.

5. In apparatus for molding articles from materials which set by the addition of water thereto, the combination of a series of molds, an overhead track, trolleys on said track from which the molds are suspended, an endless chain, connections between the same and the trolleys, sprocket-wheels around which said chain passes, and driving means connected to one of said sprockets.

6. A mold for forming articles from materials which set by the addition of water thereto comprising two vertically-arranged sections hinged together, fastening means for said sections, and a support therefor, and suspending means connected to said support.

7. A mold of the character described comprising two vertically-arranged sections hinged together, fastening means therefor, a core in said mold, and a support for said molds and core, and suspending means connected to said support.

8. A mold of the character described comprising two vertically-arranged sections hinged together, fastening means for the same, a base upon which the same are supported, and a core connected to said base, and suspending means connected to said base.

9. A mold of the character described comprising two vertically-arranged sections hinged together, fastening means therefor, a base therefor, a core supported in said mold, and suspending means attached to said base.

10. A mold of the character described comprising two vertically-arranged sections, means for securing the same together, and a core arranged vertically in the center of said molds and provided with oppositely-arranged wings, one of said wings extending out to and connecting with the mold, and the other of said wings being narrower.

11. A mold of the character described comprising two vertically-arranged sections, means for securing the same together, a base therefor, a core arranged vertically in said mold and supported on said base, and a funnel resting on said mold and provided with means for centering the upper end of said core.

In testimony whereof I, the said JOHN A. McCONNELL, have hereunto set my hand.

JOHN A. McCONNELL.

Witnesses:
ROBERT C. TOTTEN,
G. KREMER.